United States Patent [19]

Engelhard

[11] 4,294,485
[45] Oct. 13, 1981

[54] WINDOW BOOT

[76] Inventor: Thomas E. Engelhard, 4325 Colfax Ave. South, Minneapolis, Minn. 55409

[21] Appl. No.: 8,539

[22] Filed: Feb. 2, 1979

Related U.S. Application Data

[63] Continuation-in-part of Ser. No. 921,276, Jul. 3, 1978, Pat. No. 4,222,605, which is a continuation-in-part of Ser. No. 738,313, Nov. 2, 1976, Pat. No. 4,114,943.

[51] Int. Cl.³ .............................................. B60P 3/32
[52] U.S. Cl. ..................................... 296/166; 296/156; 49/475; 52/208
[58] Field of Search ....................... 296/146, 166, 156; 52/208, 400; 285/189, 201, 222; 49/483, 475; 403/50, 5; 287/189.36; 277/101

[56] References Cited
U.S. PATENT DOCUMENTS

| | | |
|---|---|---|
| 2,595,833 | 6/1952 | Flaherty ........................ 296/97 D |
| 3,208,290 | 8/1965 | Mathues et al. .................. 74/18.1 |
| 3,321,234 | 5/1967 | Harrell et al. ..................... 296/166 |
| 3,404,909 | 10/1968 | Gottschald ............................ 403/51 |
| 3,508,786 | 4/1970 | Colville ............................ 296/99 R |
| 3,586,119 | 6/1971 | Chuchus ................................ 18/14 |
| 3,596,916 | 8/1971 | Gottschald ......................... 277/212 |
| 3,638,991 | 2/1972 | Hathaway .......................... 296/156 |
| 3,837,700 | 9/1974 | Slyke ................................... 296/156 |
| 3,840,266 | 10/1974 | Carlson ................................ 296/99 |
| 3,853,348 | 10/1974 | Bjork et al. ......................... 296/156 |
| 3,900,224 | 8/1975 | Copeland ............................ 296/166 |

Primary Examiner—Richard A. Bertsch
Attorney, Agent, or Firm—Norman P. Friederichs

[57] ABSTRACT

A boot is provided which includes a resiliently deformable frame shaped to the respective contours of the rear window aperture of the truck cab and front window aperture in the forward wall of the camper. The opposite end walls of the boot frame terminate in portions adapted for attachment to the cab an camper. One of said portions includes magnetic attachment means.

7 Claims, 5 Drawing Figures

U.S. Patent  Oct. 13, 1981  4,294,485
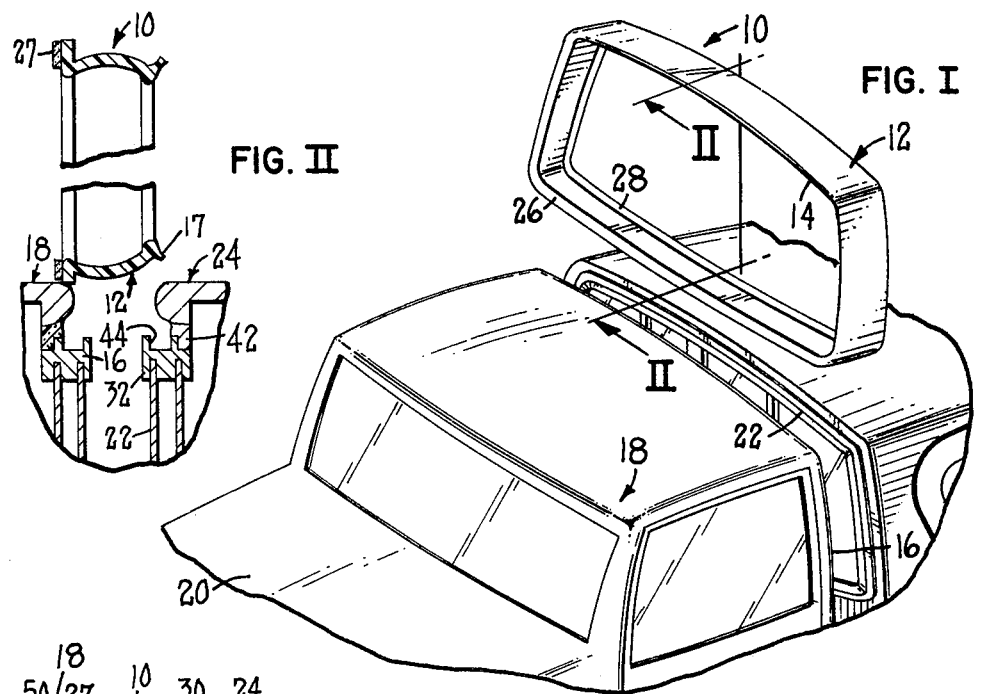
FIG. I
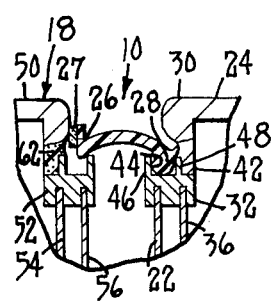
FIG. II
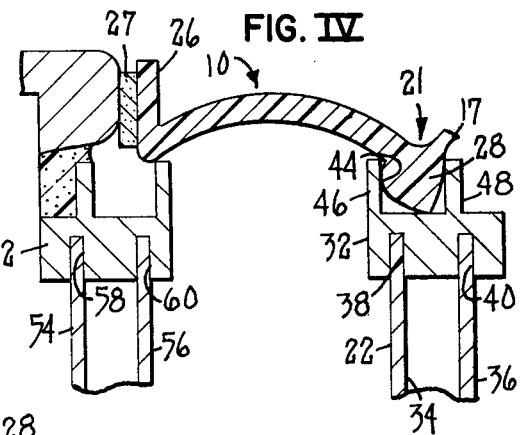
FIG. IV
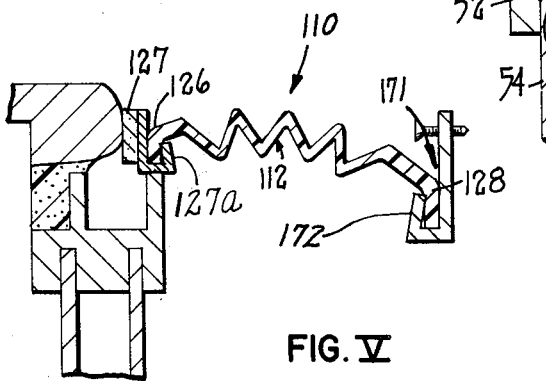
FIG. III
FIG. V

WINDOW BOOT

BACKGROUND OF THE INVENTION

This is a continuation-in-part application of copending U.S. patent application Ser. No. 921,276, filed July 3, 1978, now U.S. Pat. No. 4,222,605, entitled "WINDOW BOOT" which is a continuation-in-part of U.S. patent application Ser. No. 738,313, filed Nov. 2, 1976, entitled "WINDOW BOOT" now U.S. Pat. No. 4,114,943.

The present invention relates generally to window boots, and more particularly to a boot of the type employed to provide an air corridor in the spacing between facing windows of a cab of a vehicle and, for instance, a recreational housing accessory mounted on the vehicle.

It is desirable to provide a connecting passage between the cab and camper in the conventional truck-camper combination. Heretofore, this generally has been achieved by removing the rear window pane from the cab of the truck and by removing the facing front window pane from the cab of the truck and by removing the facing front window pane from the forward wall of the camper. The two window apertures have then been coupled by means of an open ended flexible boot. Such boot has extended into the respective window apertures both of the truck and the camper. The boot thus defines a passage therebetween.

It is undesirable to require removal of the window panes in the cab and camper for installation of the boot, even when the installed boot permits installation of the panes thereafter. For example, removal of the window panes is bothersome and may be time consuming.

The window boot as defined in U.S. Pat. No. 4,114,943 issued Sept. 19, 1978, overcame the disadvantages of such earlier window boots; however, that window boot was adapted to fit only certain vehicles and campers. The present window is designed to fit nearly any available pick-up and camper combination and can be installed without removal of the windows.

SUMMARY OF THE INVENTION

Generally speaking, in accordance with the invention, a boot is provided which includes a resiliently deformable boot frame shaped to the respective contours of the rear window aperture of the truck cab and front window aperture in the forward wall of the camper. The present invention provides a novel boot assembly which is releasably secured to the cab and camper. The opposite ends of the boot frame are adapted for attachment to the cab and camper. One of such ends may include a magnetic strip which may be magnetically adhered to the cab. The other end of the boot may be frictionally held in a channel member secured to the camper.

The boot is mounted in the respective window frames without adhesives, nails, screws, bolts or the like. It is also not necessary to remove either window to make the installation. Both windows remain slidable in their frames after the installation, and yet the boot is easily removed. The present boot assembly for a cab/camper permits operation of the windows without interference from the boot. Still other advantages of the invention will be apparent from the disclosure of the present invention.

BRIEF DESCRIPTION OF THE DRAWINGS

FIG. I is a perspective view of a truck cab and camper together with the boot constructed according to the instant invention;

FIG. II is a fragmentary detail view of the invention taken along line II—II of FIG. I;

FIG. III is a view similar to FIG. II, however with the boot installed;

FIG. IV is an enlarged view of a portion of FIG. III; and

FIG. V is a view of an alternate embodiment.

DETAILED DESCRIPTION OF THE INVENTION

Referring now to the drawings, the boot 10 constructed according to the instant invention generally comprises a resiliently deformable sidewall or web 12 which may be continuous. The sidewall 12 defines an aperture 14 correspondingly registerable with a rear window 16 mounted in a cab 18 of the truck generally numbered 20, and a facing front window 22 mounted in the forward wall of a camper 24. The sidewall 12 terminates in a pair of opposite ends or continuous lips 26 and 28. The lip 26 may include a magnetic strip 27 which is adapted for attachment to the metal cab 18. The magnetic strip 27 may be molded integral with lip 26 or secured thereto with adhesive. The thickened lip 28 of boot 10 includes a flange-like projection 17. The projection 17 serves to seal the boot and the windows while providing a trough 21 for carrying water away. The boot 10 is releasably mounted between cab 18 and camper 24 as hereinafter described in detail.

The cab 18 and the camper 24 are of conventional construction, and do not per se from a part of this invention. Mounted in the front facing of the camper housing 30 is a sash frame 32 for the window 22 which comprises first and second slidable panes 34 and 36, the panes 34 and 36 being slidable in adjacent runners 38 and 40 provided in frame 32. As best seen in FIGS. II and III, the frame 32 is secured to the camper housing by weather stripping 42. A U-shaped channel 44 is formed on the top surface of frame 32 by corresponding adjacent flanges 46 and 48 upstanding therefrom.

One end of the weather stripping is secured to the camper housing 30 by conventional means, such as an adhesive. The frame flange 48 is fully embedded in the other end of weather stripping 42, whereby the frame 32 is fixedly secured to the housing 30. The weather stripping 42 is of substantially rigid construction and overhangs into channel 44, thereby providing a partial blockage therein.

As best seen in FIG. III, the lip 28 provided in sidewall 12 is snap-fit into the channel 44 for releasably mounting the boot frame 10 on camper 30.

The rear window 16 in cab 18 is constructed, assembled and mounted in the cab housing 50, in any conventional manner and may be similar to that described with regard to window 22.

The rear window 16 of cab 18 includes a sash frame 52 which carries first and second slidable panes 54 and 56. The first and second panes 54 and 56 are slidable in adjacent runners 58 and 60 of frame 52. The frame 52 may be secured to the cab 18 by weather stripping 62. The lip 26 of boot 10 carries the magnetic strip 27 which is magnetically secured to metal cab 18.

The boot 10 may be mounted in place by inserting the boot 10 into the space between cab 18 and camper 24.

The boot 10 is first aligned with the windows 16 and 22. The lip 28 is pressed into channel 44 where it is frictionally held. The lip 26 in like manner is positioned properly with strip 27 engaging cab 18.

The boot 10 can be removed by reversing the procedure. In other words, one may pull the magnetic strip 27 from the cab 18 and push upwardly on the boot 10 thus forcing the lip 28 out of the channel 44. The boot may then be removed from between the cab 18 and camper 24.

Alternate Embodiment

An alternate embodiment of the present invention, boot 110, is illustrated in FIG. V. The boot 110 includes a sidewall or web 112 and a pair of lips 126 and 128. Boot 110 includes a magnetic strip 127 at one end and a portion 128 at the other end. The magnetic strip 127 includes a channel 127a which is collapsed to frictionally entrap a portion of web 112. Alternatively, the web 112 may be secured to magnetic strip 127 by adhesive. The portion 128 of web 112 is adapted for entrapment in a channel member 171. Web portion 128 may be entrapped by collapsing channel portion 172 inwardly. Channel 171 in turn may be secured to the camper such as by screws 172.

The web 112 in this embodiment is shown of accordian construction which enables the boot to expand or contract to fit various spacing between cab and camper. In other words, in some instances, the space between the cab and camper may be greater and in other instances the spacing may be less. A single boot of the type shown in FIG. V will work in both cases. The boot 110 will also function satisfactorily in those instances where the spacing between the camper window and the cab window may be non-uniform, for example, spaced closer at the bottom and spaced greater at the top. Boot 110 is suitable for use where one window is higher than the other window.

While the boot may be fabricated of a number of different materials, rubber is a preferred material. It is a feature of the invention that the boot and mounting therefore do not inhibit window movement of either window. It is another feature of this invention that the boot is readily removable and replaceable.

Of course, various changes may be made in the above constructions without departing from the spirit and scope of the present invention and it is intended that all matter contained in the above description or shown in the accompanying drawings shall be interpreted as illustrative and not in a limited sense.

What is claimed:

1. A combination including a boot and frame windows of a cab/camper assembly of the type having a rear frame window in the cab and a corresponding front frame window in the forward wall of the camper, said boot comprising a boot frame including a continuous resiliently deformable sidewall, said sidewall defining an aperture corresponding respectively to said windows in said cab and said camper, said sidewall terminating in respective opposite ends, one of said opposite ends including a thickened resilient continuous lip, said lip being adapted to be snap-fit into a corresponding window frame for thereby mounting said boot between said cab and camper, said window frame including an exteriorly extending substantially U-shaped channel in which the lip of said boot is grippingly receivable, the other of said ends including magnetic means for securement of said boot to said cab, whereby said boot may be easily mounted and dismounted from said cab and camper.

2. The combination of claim 1 wherein said magnetic means comprise a magnetic strip secured to said boot along said other end.

3. The combination of claim 1 wherein said magnetic means comprise magnetic strip molded integral with said other end.

4. The combination of claim 1 wherein the said wall of said boot frame comprises an arcuate web.

5. The combination of claim 1 wherein the sidewall of said boot frame comprises an accordian-type wall.

6. The combination of claim 1 wherein said thickened lip includes seal flange means which cooperate with said web to form a water trough.

7. The combination of claim 1 wherein said seal flange means cooperate with a portion of said accordian-type wall to form a water trough.

* * * * *